Figure 1:
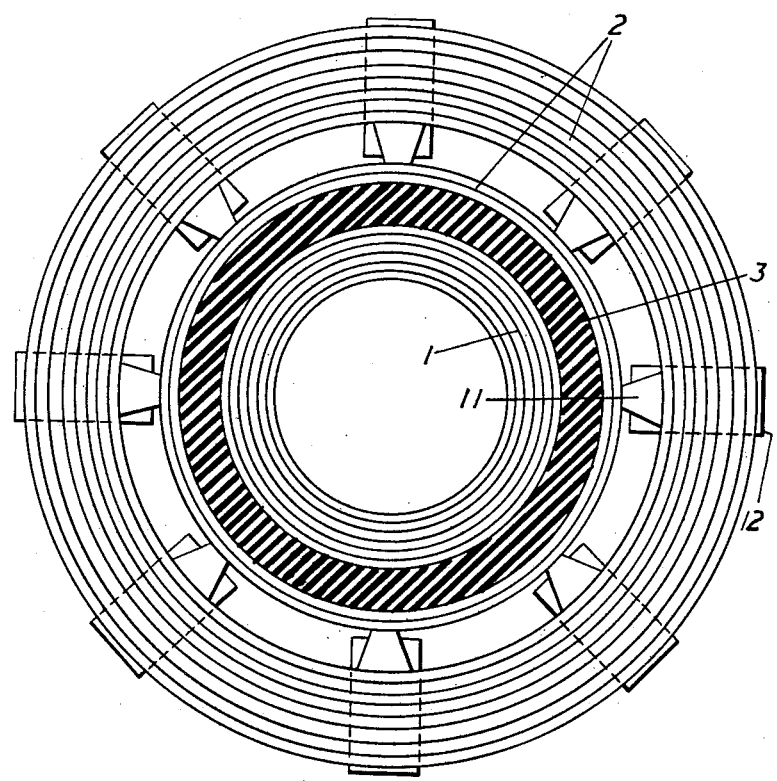

July 10, 1962

G. HALL ET AL 3,044,030

INDUCTIVE WINDINGS

Filed Nov. 24, 1959

2 Sheets-Sheet 1

Inventors
GEOFFREY HALL
KEITH RUSSELL HIGHTON

By
Cameron, Kerkam & Sutton
Attorneys

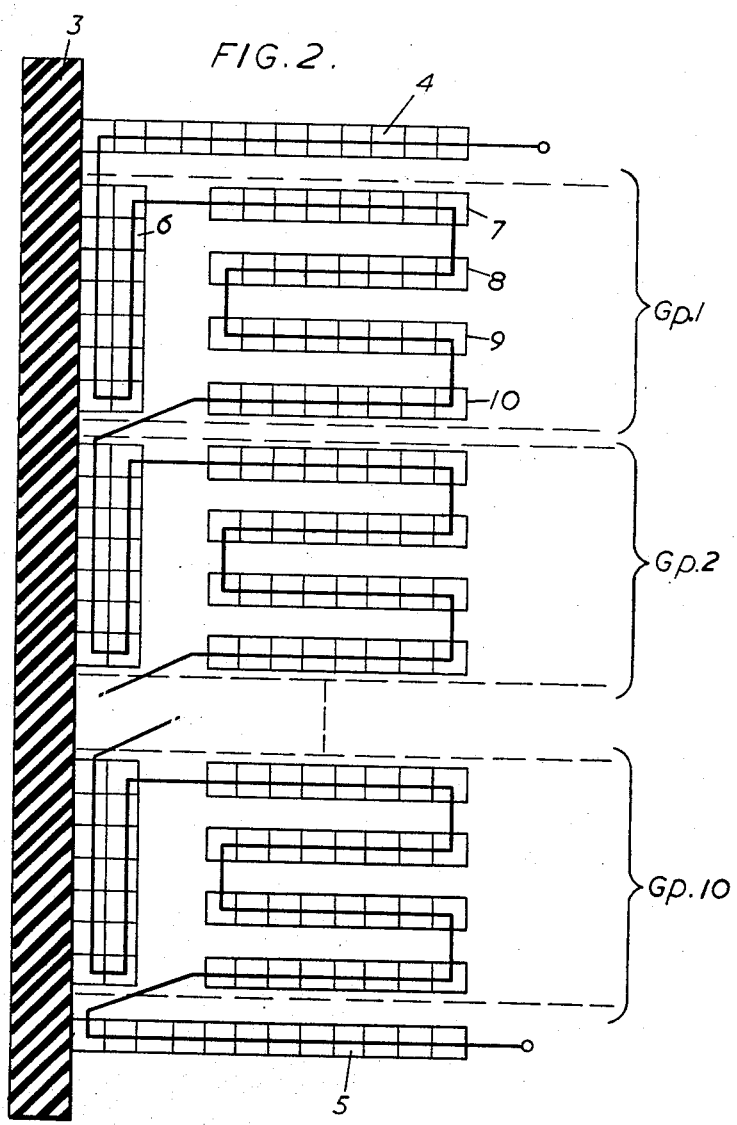

3,044,030
INDUCTIVE WINDINGS
Geoffrey Hall, Failsworth, Manchester, and Keith Russell Highton, Chadderton, England, assignors to Ferranti, Limited, Hollinwood, Lancashire, England, a company of Great Britain
Filed Nov. 24, 1959, Ser. No. 855,210
Claims priority, application Great Britain Dec. 5, 1958
1 Claim. (Cl. 336—60)

This invention relates to inductive windings for use, for example, in transformers.

In transformers it is sometimes desirable to utilise solid insulation between an inner winding surrounded by an outer winding which is immersed in oil. The use of solid insulation between the windings permits a decrease in the size of the outer winding with a consequent saving in copper and a reduction of the losses in the outer winding.

The use of solid insulation between the inner and the outer windings, however, necessitates the provision of an axial duct in the outer winding to facilitate circulation of the oil for cooling purposes. The provision of this duct has previously involved complicated winding arrangements.

It is accordingly an object of the present invention to provide an easily wound inductive winding having an axial duct.

According to the present invention an inductive winding includes one or more groups of turns, each group comprising, on a common axis, a helically wound section having one or more layers, and a plurality of spirally wound sections spaced apart and surrounding said helically wound section, the inner turn of each spirally wound section being spaced from the outer layer of said helically wound section, thus forming an axial duct within the winding.

In this specification "helically wound" means wound in the form of a cylinder helix and "spirally wound" means wound in any form of a flat spiral.

One embodiment of the present invention as applied to a transformer will now be described by way of example with reference to the accompanying drawings in which:

FIGURE 1 shows a sectional plan of one leg of a transformer having a winding in accordance with the invention and FIGURE 2 shows a sectional elevation of the high voltage winding of FIGURE 1.

Referring now to the drawings, a transformer includes a low voltage winding 1 surrounding one leg of a transformer core (not shown). The low voltage winding 1 is separated from a high voltage winding 2 by means of a tube of solid insulation 3 such as paper.

The high voltage winding 2, seen more clearly in the sectional elevation of FIGURE 2, includes an initial section 4 and a final section 5, both spirally wound, and ten groups of turns Gp. 1 to Gp. 10 of which only three are shown.

Each of the groups Gp. 1 to Gp. 10 has a double-layer helically wound section 6 and four spirally wound sections 7, 8, 9, and 10. The inner turns of the spirally wound sections 7, 8, 9 and 10 are spaced from the outer layer of the helically wound section 6 by spacers 11, and the spirally wound sections are spaced apart by spacers 12 which are keyed to the spacers 11.

The last turn of the spirally wound section 10 of Gp. 1 is connected to the first turn of the helically wound section of Gp. 2 and in this manner each group is connected to the next group, the last turn of the last spirally wound section in Gp. 10 being connected to the first turn of the final section 5. The initial section 4 and the final section 5 are not essential to the invention but are shown as a convenient method of leading the conductor into and out of the winding.

It will be seen that the winding described above is simple to wind and there is an axial duct formed in the winding to allow circulation of the oil in which the winding is immersed.

The spirally wound sections described above have been shown as simple spiral windings. If it is desired to improve the surge strength of these windings by increasing their series capacitance they may be wound in any suitable form of flat spiral winding.

What we claim is:

An inductive winding including a plurality of groups of turns, each group comprising, on a common axis, a helically wound section having a plurality of layers, and a plurality of axially spaced spirally wound sections surrounding said helically wound section, the radially inner turn of each spirally wound section being spaced radially from the outermost layer of said helically wound section, the spaces between the inner turns of said spirally wound sections and the outermost layer of said helically wound section forming an axial duct within the winding, the last turn of the outermost layer of the helically wound section of each group being electrically connected to the radially inner turn of the first spirally wound section of the same group, and the radially inner turn of the last spirally wound section of said group being electrically connected to the first turn of the innermost layer of the helically wound section of the next group, whereby the helically wound sections and spirally wound sections of all of said groups are electrically connected in series with one another to form a continuous winding.

References Cited in the file of this patent
UNITED STATES PATENTS
2,840,790   Vogel ------------------ June 24, 1958
FOREIGN PATENTS
416,541   Great Britain ---------- Sept. 17, 1934